(12) United States Patent  
Bhat et al.

(10) Patent No.: US 8,819,642 B2  
(45) Date of Patent: Aug. 26, 2014

(54) METHOD AND SYSTEM FOR GENERATING AND PROCESSING BLACK BOX TEST CASES

(75) Inventors: Anant Ramdev Bhat, Bangalore (IN); Giripriya MeenakshiSundaram, Banaswadi (IN); Naveen Kumar, Gaya (IN)

(73) Assignee: Cognizant Technology Solutions India Pvt. Ltd. (IN)

( * ) Notice: Subject to any disclaimer, the term of this patent is extended or adjusted under 35 U.S.C. 154(b) by 287 days.

(21) Appl. No.: 13/544,285

(22) Filed: Jul. 9, 2012

(65) Prior Publication Data

US 2013/0311976 A1 Nov. 21, 2013

(30) Foreign Application Priority Data

May 17, 2012 (IN) .......................... 1966/CHE/2012

(51) Int. Cl.  
*G06F 9/44* (2006.01)

(52) U.S. Cl.  
USPC ............................ 717/130; 717/124; 717/127

(58) Field of Classification Search  
USPC ......................................... 717/124, 127, 130  
See application file for complete search history.

(56) References Cited

U.S. PATENT DOCUMENTS

| 7,886,272 B1* | 2/2011 | Episkopos et al. ............ 717/124 |
| 2005/0144529 A1 | 6/2005 | Gotz et al. |
| 2007/0033440 A1* | 2/2007 | Tillmann et al. ................ 714/38 |
| 2009/0094575 A1 | 4/2009 | Vieira et al. |
| 2010/0180256 A1 | 7/2010 | Gorthi et al. |
| 2011/0016451 A1 | 1/2011 | Gorthi et al. |
| 2011/0016452 A1 | 1/2011 | Gorthi et al. |
| 2012/0284697 A1* | 11/2012 | Choppakatla et al. ........ 717/127 |

* cited by examiner

*Primary Examiner* — Li B Zhen  
*Assistant Examiner* — Duy Khuong Nguyen  
(74) *Attorney, Agent, or Firm* — Lerner, David, Littenberg, Krumholz & Mentlik, LLP

(57) ABSTRACT

A method and system for generating and processing test cases for effective black box testing of software applications is provided. Test cases are automatically generated based on parameters that are identified from automated manual test cases associated with business models. The generated automated test cases cover one or more paths in the business models. Further, the automated test cases are optimized by determining minimal path covered by the automated test cases in the business models. The optimization is performed based on analysis of the one or more paths covered by the automated test cases in the business models. Furthermore, code coverage data of the optimized test cases are obtained by execution of the optimized test cases. Finally, based on the code coverage data and predetermined conditions, the optimized test cases are analyzed for at least prioritization and further optimization of the optimized test cases for effective black box testing.

16 Claims, 7 Drawing Sheets

METHOD AND SYSTEM FOR GENERATING AND PROCESSING BLACK BOX TEST CASES

FIELD OF THE INVENTION

The present invention relates generally to the field of test case generation for software testing and more specifically to a method and system for optimizing automatically generated test cases and determining code coverage data of test cases for effective black box testing.

BACKGROUND OF THE INVENTION

Black box testing is a widely used technique in software testing. Black box testing involves testing a software application without relying on the internal structure of the software application. Black box testers may not always have visibility to the lines of code of the software application covered by test cases during its execution. As such, black box testers do not have knowhow of code coverage percentage of test cases. Code coverage percentage is a measurement of lines of code of the software application that have been covered when the test case is executed against the software application code. Consequently, due to lack of knowledge of code coverage percentage of the black box test cases, effectiveness of test suite comprising of test cases cannot be measured. For example, in the event there are changes made in the software application code under test, impact analysis of the black box test cases cannot be done efficiently. In addition, lack of knowledge of code coverage results in redundant test execution and may also result in executing incorrect test cases which in turn is time consuming. Moreover, black box test cases are manually created and executed which is not an efficient process and entails a lot of manual effort in designing and maintaining the test cases. Manual authoring of test cases and lack of knowledge of code coverage data therefore impact quality of black box testing.

In light of the abovementioned disadvantages, there is a need for a method and system for automatic generation of test cases. In addition, there is a need for a method and system for optimization of the automatically generated test cases. Further, there is a need for a method and system for determining code coverage data of the test cases for efficient and effective black box testing.

SUMMARY OF THE INVENTION

A computer-implemented method for generating and processing one or more test cases, via program instructions stored in a memory and executed by a processor, for effective black box testing of software applications is provided. In an embodiment of the present invention, the computer-implemented method comprises automatically generating one or more test cases, by the processor, based on one or more parameters. The one or more parameters are identified from one or more automated manual test cases associated with one or more business models. Further, the generated one or more automated test cases cover one or more paths in the one or more business models. The method further provides optimizing, by the processor, the one or more automated test cases. The one or more automated test cases are optimized by determining minimal path covered by the one or more automated test cases in the one or more business models based on analysis of the one or more paths covered by the one or more automated test cases in the one or more business models. Furthermore, the method comprises obtaining, by the processor, code coverage data of the optimized test cases. The code coverage data is obtained by execution of the optimized test cases. The code coverage data represents percentage of code of the software applications covered by the optimized test cases. Finally, the method comprises analyzing, by the processor, the optimized test cases for at least prioritization and further optimization of the optimized test cases based on the code coverage data and one or more predetermined conditions for black box testing.

A computer-implemented method for optimizing one or more test cases via program instructions stored in a memory and executed by a processor is provided. In an embodiment of the present invention, the computer-implemented method comprises, firstly analyzing, by the processor, one or more paths covered by the one or more test cases in one or more business models to obtain one or more unique paths that cover one or more nodes in the one or more business models only once. Secondly, the method comprises identifying, by the processor, one or more paths with maximum number of uncovered nodes from the one or more unique paths. The method further comprises storing, by the processor, the identified one or more paths in a repository. The identified one or more paths represent paths that cover the one or more nodes in the one or more business models at least once.

A computer-implemented method for obtaining code coverage data of one or more test cases for black box testing via program instructions stored in a memory and executed by a processor is provided. The computer-implemented method comprises, firstly, generating, by the processor, an instrumented code by inserting a set of instructions in software applications under test for tracing and recording execution of the one or more test cases. Secondly, the method comprises executing, by the processor, the one or more test cases against the instrumented code. Further, the method comprises capturing, by the processor, lines of code of the software applications covered by the one or more test cases during execution of the one or more test cases. Finally, the method comprises obtaining, by the processor, code coverage data based on the captured lines of code, wherein the code coverage data represents percentage of code of the software applications covered by the one or more test cases.

A system for generating and processing one or more test cases for effective black box testing of software applications is provided. The system comprises an automatic test case generator in communication with a processor and configured to automatically generate one or more test cases based on one or more parameters. The one or more parameters are identified from one or more automated manual test cases associated with one or more business models. Further, the generated one or more automated test cases cover one or more paths in the one or more business models. The system further comprises a test case optimizer in communication with the processor and configured to optimize the one or more automated test cases. The one or more automated test cases are optimized by determining minimal path covered by the one or more automated test cases in the one or more business models based on analysis of the one or more paths covered by the one or more automated test cases in the one or more business models. The system further comprises a code coverage data generator in communication with the processor and configured to obtain code coverage data of the optimized test cases. The code coverage data is obtained by execution of the optimized test cases. The code coverage data represents percentage of code of the software applications covered by the optimized test cases. Further, the optimized test cases are processed based on the code coverage data for black box testing.

A system for obtaining code coverage data of one or more test cases for effective black box testing is provided. The system comprises a code instrumentor in communication with a processor and configured to generate an instrumented code by inserting a set of instructions in software applications under test for tracing and recording execution of the one or more test cases. The system further comprises a server in communication with the code instrumentor and configured to, firstly, execute the one or more test cases against the instrumented code. The server then captures lines of code of the software applications under test covered by the one or more test cases during execution of the one or more test cases. The system further comprises a code coverage data module in communication with the processor and configured to obtain code coverage data based on the captured lines of code. The code coverage data represents percentage of code of the software applications covered by the one or more test cases.

A computer program product comprising a non-transitory computer-readable medium having computer-readable program code stored thereon is provided. The computer-readable program code comprises instructions that, when executed by a processor, cause the processor to automatically generate one or more test cases based on one or more parameters. The one or more parameters are identified from one or more automated manual test cases associated with one or more business models. Further, the generated one or more test cases cover one or more paths in the one or more business models. Furthermore, the computer-readable program code comprises instructions that, when executed by the processor, cause the processor to optimize the one or more automated test cases. The one or more automated test cases are optimized by determining minimal path covered by the one or more automated test cases in the one or more business models based on analysis of the one or more paths covered by the one or more automated test cases in the one or more business models. Further, the computer-readable program code comprises instructions that, when executed by the processor, cause the processor to obtain code coverage data of the optimized test cases. The code coverage data is obtained by execution of the optimized test cases. The code coverage data represents percentage of code of software applications covered by the optimized test cases. Finally, computer-readable program code comprises instructions that, when executed by the processor, cause the processor to analyze the optimized test cases for at least prioritization and further optimization of the optimized test cases based on the code coverage data and one or more predetermined conditions for black box testing.

A computer program product comprising a non-transitory computer-readable medium having computer-readable program code stored thereon is provided. The computer-readable program code comprising instructions that, when executed by a processor, cause the processor to obtain one or more unique paths covered by the one or more test cases in the one or more business models. The one or more unique paths represent paths that cover one or more nodes in the one or more business models only once. Further, the computer-readable program code comprises instructions that, when executed by the processor, cause the processor to store the obtained unique paths in a first list in a repository. Furthermore, the computer-readable program code comprises instructions that, when executed by the processor, cause the processor to create a matrix of a plurality of nodes of the one or more business models. The matrix comprises one or more paths covered by the one or more test cases. Further, the one or more paths covered by the one or more test cases include the unique paths. The computer-readable program code further comprises instructions that, when executed by the processor, cause the processor to identify a path in the matrix with maximum number of uncovered nodes. The path is identified by iterating over the one or more paths covered by the one or more test cases in the matrix. The computer-readable program code further comprises instructions that, when executed by the processor, cause the processor to remove the identified path with maximum number of uncovered nodes from the first list of unique paths and store the identified path in a second list in the repository. Further, the computer-readable program code comprises instructions that, when executed by the processor, cause the processor to repeat the step of identifying a path in the matrix with maximum number of uncovered nodes until each of the plurality of nodes in the matrix are covered, to identify one or more paths with maximum number of uncovered nodes in the matrix. Finally, the computer-readable program code comprises instructions that, when executed by the processor, cause the processor to remove the identified one or more paths with maximum number of uncovered nodes from the first list of unique paths and store the identified one or more paths in the second list in the repository. The one or more paths stored in the second list represent paths that cover each of the plurality of nodes in the one or more business models at least once.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system, method and computer-program product is provided for generating and processing test cases for effective black box testing. The invention provides for automatically generating test cases from automated manual test cases associated with business models. The invention further provides for optimizing the automatically generated test cases. Further, the invention provides for obtaining code coverage data of the test cases for effective black box testing.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
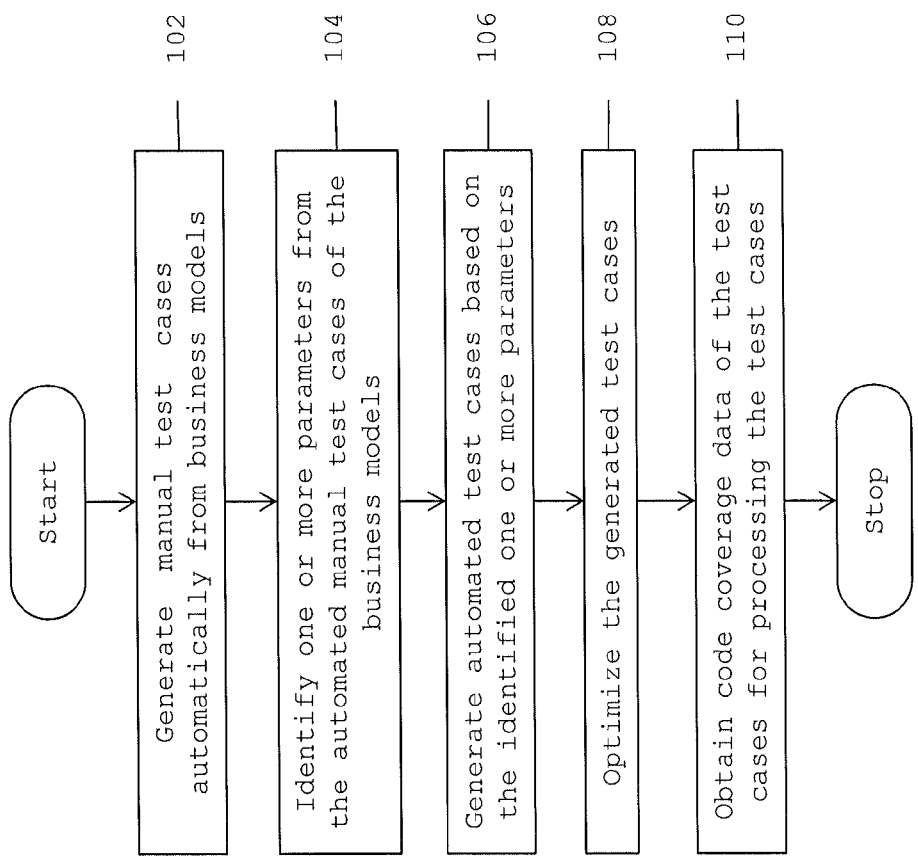
FIG. 1 is a flowchart of a method for automatically generating test cases, in accordance with an embodiment of the present invention.

FIG. 1 is a flowchart of a method for automatically generating test cases, in accordance with an embodiment of the present invention.

At step 102, one or more manual test cases are automatically generated from one or more business models. In an embodiment of the present invention, the business models are created, by a tester, which includes various business flows. The business flows represent behavior of various functionalities of software applications under test. In an exemplary embodiment of the present invention, the business flows are defined using Unified Modeling Language (UML) notations. The business models are created based on predefined business rules which are defined for the software applications by the tester. The business models include various nodes such as start node, end node, processing node, decision node and various other nodes related to the various business flows of the software applications. In an exemplary embodiment of the present invention, the nodes represent a single unit of behavior of the software applications under test. In another exemplary embodiment of the present invention, the nodes represent multiple units of behavior of the software applications under test.

In another embodiment of the present invention, the tester manually tags one or more parameters to one or more nodes at the time of creating the business models. In an exemplary embodiment of the present invention, the one or more parameters include detailed test steps, expected results, user inputs, and actions related to testing of the software applications. In another exemplary embodiment of the present invention, the one or more parameters include user interface elements of the software applications under test and the corresponding action. The business flows or paths between any two nodes (i.e. from start node to end node) represent a test scenario. In the event of compilation of the business models, manual test cases are automatically generated for all the paths based on the one or more parameters which are tagged to the one or more nodes of the business models. In an embodiment of the present invention, the automatically generated manual test cases are stored in a test case repository. The automatically generated manual test cases are hereinafter referred as automated manual test cases.

At step 104, one or more parameters from the automated manual test cases associated with the one or more business models are identified. In an embodiment of the present invention, the automated manual test cases are identified from the business models. The one or more parameters are then identified by parsing the automated manual test cases. In an exemplary embodiment of the present invention, the automated manual test cases are parsed by separating inputs and actions of the automated manual test cases. The identified parameters are stored in one or more repositories.

At step 106, one or more test cases are generated automatically based on the identified one or more parameters. In an embodiment of the present invention, the identified parameters are retrieved from the one or more repositories and the parameters are used to generate the test cases automatically. The automatically generated test cases are hereinafter referred as automated test cases. The automated test cases are stored in the test case repository. In an exemplary embodiment of the present invention, if the identified one or more parameters are the user interface elements of the software applications under test, a predefined template corresponding to the user interface elements is retrieved from the one or more repositories. The predefined template includes one or more properties of the user interface elements of the software applications under test. The automated test cases are then generated based on the one or more properties of the user interface elements and the corresponding actions. In an exemplary embodiment of the present invention, the automated test cases are automated black box test cases.

In an embodiment of the present invention, the automated test cases are associated with the nodes in the business models. For a particular node, test steps of a particular automated test case are replicated across all the automated test cases that are associated with that particular node. In an embodiment of the present invention, the automated test cases may be modified by the tester.

In another embodiment of the present invention, the automated test cases are executed and various test results are obtained. In an embodiment of the present invention, the obtained test results may be recorded and stored in the one or more repositories for future reference.

In an exemplary embodiment of the present invention, the obtained test results may be visually presented in the business models via a user interface. For visual presentation, a coloring scheme may be used in each node to indicate success or failure of test runs associated with each node. For example, if the test results obtained for a particular node are negative, that particular node is coloured red to indicate failure. The node inferred as failure facilitates to automatically identify impacted automated test cases or impacted automated manual test cases. In various embodiments of the present invention, the impacted automated test cases or automated manual test cases may be analyzed for further processing.

At step 108, the one or more generated test cases are optimized. In an embodiment of the present invention, the one or more test cases are retrieved from the test case repository. In an exemplary embodiment of the present invention, the one or more test cases are the automated manual test cases. In another exemplary embodiment of the present invention, the one or more test cases are the automated test cases. The retrieved test cases are optimized by determining minimal path coverage of the test cases in the business models. The minimal path coverage of the test cases is determined by analyzing paths covered by the test cases in the business models using a path analysis algorithm. Based on the analysis, test cases which cover each node in the business models at least once are identified. These test cases are the optimized set of test cases. The optimized set of test cases comprises test steps that cover corresponding nodes in the business models at least once. In an embodiment of the present invention, the optimized test cases are stored in the test case repository.

At step 110, code coverage data of the one or more test cases are obtained for processing the one or more test cases at the time of black box testing. In an embodiment of the present invention, when the one or more test cases are executed against the software application codes, lines of code covered by the test cases are captured. In an exemplary embodiment of the present invention, the optimized test cases are executed against the software application codes. Lines of code covered by the optimized test cases are captured to obtain code coverage data. The code coverage data represent percentage of code covered by the test cases. Based on the code coverage data, the tester can perform effective black box testing by efficient prioritization and optimization of the test cases. In another exemplary embodiment of the present invention, the automated test cases are executed against the software applications and the code coverage data of the automated test cases is obtained. In yet another exemplary embodiment of the present invention, the automated manual test cases are executed against the software applications and the code coverage data of the automated manual test cases is obtained. In another exemplary embodiment of the present invention, manual test cases are executed against the software applications and the code coverage data of the manual test cases are obtained. In an embodiment of the present invention, the manual test cases are test cases which are written manually in a spreadsheet such as MS Excel.

In an embodiment of the present invention, while capturing the code coverage data, the software application code that is traversed during test case execution is stored in the one or more repositories.

In an embodiment of the present invention, based on the code coverage data, the test cases (i.e. the automated manual test cases or the automated test cases or the optimized test cases or the manual test cases) can be prioritized for next cycle of execution of the test cases. For prioritization, the test cases covering the maximum lines of code are assigned a high priority. The test cases covering the minimum lines of code are assigned a low priority. The high priority test cases are executed first in the next cycle of execution of the test cases. In another exemplary embodiment of the present invention, the test cases are prioritized by identifying the test cases that cover critical code paths in the software application code. The critical code paths include methods that are frequently used across the software application code. The critical code paths covered by each test case are identified based on the code coverage data of each test case. The identification facilitates to ensure that breakages along the critical paths are uncovered during early stage of testing. In an embodiment of the present invention, a coverage report indicating prioritization of test cases may be generated at a test case level for an entire test suite.

In another embodiment of the present invention, based on the code coverage, test cases can be further optimized for next cycle of execution of the test cases. For optimization, the test cases that cover the same lines of code are identified. The identified test cases are not executed in the next cycle of execution of the test cases. The identification facilitates to avoid redundancy in test execution. In an embodiment of the present invention, a redundancy report capturing test cases that execute the same lines of code may be generated at a test case level for the entire test suite.

In yet another embodiment of the present invention, based on the code coverage data, an appropriate set of test cases is identified that correspond to a modified software application code. The modified software application code is verified against the corresponding stored software application code (as discussed at step 110). Based on the verification, impacted test cases are ascertained from the identified appropriate set of test cases. Consequently, regression effort is reduced. In another embodiment of the present invention, based on the code coverage data, test cases that are not used optimally may be highlighted. Further, new components of the modified software application code that are not covered as part of existing test cases may also be highlighted.

In another embodiment of the present invention, based on the code coverage data, covered and uncovered lines of code of the test cases may be displayed. For improving code coverage, new test cases may be added to the test suite for strengthening the test cases.

Figure 2:
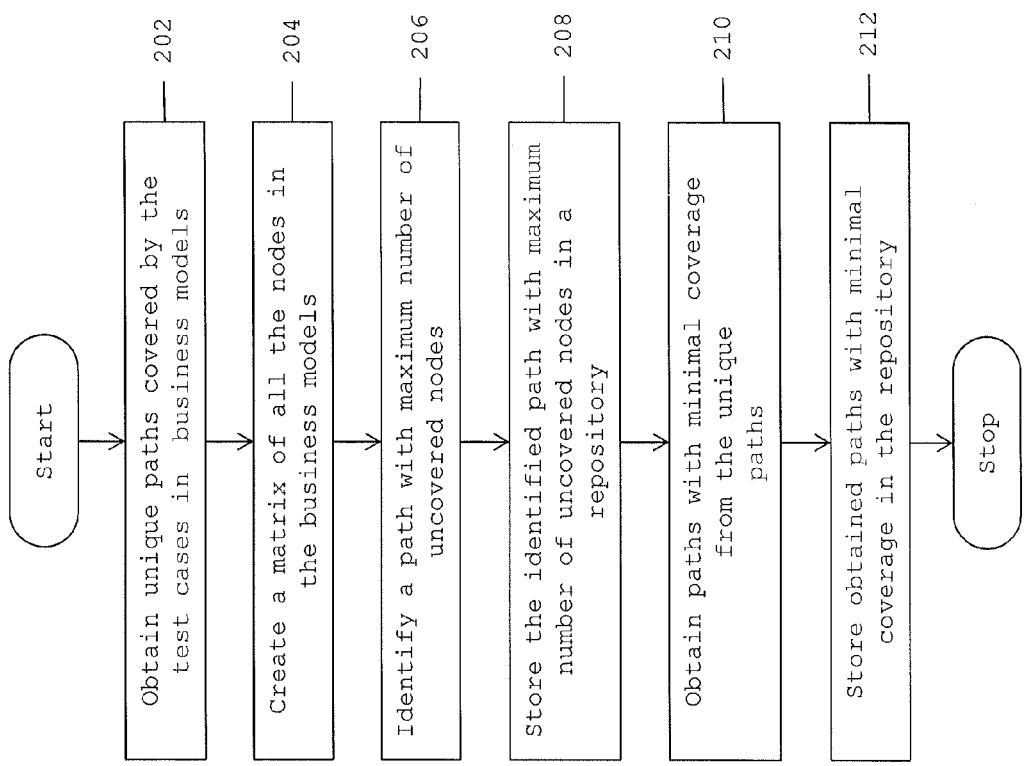
FIG. 2 is a flowchart of a method for optimizing automatically generated test cases, in accordance with an embodiment of the present invention.

FIG. 2 is a flowchart of a method for optimizing automatically generated test cases, in accordance with an embodiment of the present invention.

At step 202, unique paths covered by the test cases in one or more business models are obtained. In an embodiment of the present invention, the unique paths are paths that cover one or more nodes in the one or more business models only once and therefore do not have redundant path coverage. The unique paths are obtained using a path analysis algorithm. An exemplary path analysis algorithm can be implemented using the following code.

```
Function GeneratePath
    Pass In: nothing
    Initialize list of paths
Initialize list of cyclic paths
Initialize StartNode
Initialize Empty Path
Call GenerateACyclicPath StartNode, Empty Path
List of unique paths = Call GenerateCyclicPath
    Pass Out: List of unique paths
EndFunction
Function GenerateACyclicPath
    Pass In: Element, Path
    IF Element is a End Node
        Store path in list of paths
        Terminate function
    Else IF Path contains the node
        It's a cyclic path. Determine the loop & store it in the loop list
    Else
        Add the element to the path
        For each outgoing edge from the element
            Add the edge to path
            Call GenerateACyclicPath edge.targetElemenet, path
    Pass Out: nothing
EndFunction
    Function GenerateCyclicPath
        Pass In: nothing
        Initialize list of acyclicPaths
        While size of acyclicPaths > 0
            For each path in acyclicPaths
                For each cyclic path
                    If the path contains the cyclic path start element
                        Create copy of path
                        Insert the cyclic path in the new path
                        Add the new path to the list of paths
        Pass Out: List of unique paths
EndFunction
```

The path analysis algorithm performs a search on all the paths in the business models and extracts all the unique paths of the business models. The unique paths are obtained by inputting various paths, identifying cyclic and acyclic paths and outputting a list of unique paths. Cyclic paths are paths in the business models which flow from a start node to an end node by looping back to a previously covered node. Acyclic paths are paths in the business models which flow from a start node to an end node without looping back to a previously covered node. The cyclic and acyclic paths are traversed in a manner represented by the code above to obtain the unique paths. The obtained unique paths are stored in a repository in a first list named "paths".

At step 204, a matrix of all the nodes in the business models is created. In an embodiment of the present invention, the matrix is created in the form of a key value pair with a node as the key and a Boolean flag indicating the node as covered or uncovered as the value. For example, a Boolean value "true" indicates covered node and a Boolean value "false" indicates uncovered node. Initially, all the nodes in the matrix are marked as uncovered.

At step 206, a path with maximum number of uncovered nodes in the matrix is identified. In an embodiment of the present invention, all the paths in the matrix covered by the test cases are iterated. The path which contains the maximum number of uncovered nodes is identified. All the nodes in the identified path are marked as covered in the matrix.

At step 208, the identified path with maximum number of uncovered nodes is stored. In an embodiment of the present invention, the identified path is stored in the repository in a second list named "optimized paths". The identified path is removed from the "paths" list.

At step 210, paths with minimal path coverage are obtained from the unique paths. In an embodiment of the present invention, the paths with minimal coverage are obtained by repeating steps 206 and 208 until all the nodes in the matrix are covered. In particular, as step 206 is repeated, one or more paths with maximum number of uncovered nodes are identified. As step 208 is repeated, all the nodes in the identified one or more paths are marked as covered in the matrix. Consequently, until all the nodes of the matrix are covered, steps 206 and 208 are repeated to find paths with maximum number of uncovered nodes. The paths identified are the paths with minimal path coverage.

At step 212, the paths with minimal path coverage are stored. In an embodiment of the present invention, the paths with minimal path coverage are stored in the repository in the list named "optimized paths". In an embodiment of the present invention, the list "optimized paths" finally contains paths which cover each node in the business models at least once. The test cases that form a part of the minimal path coverage are the optimized set of test cases.

Figure 3:
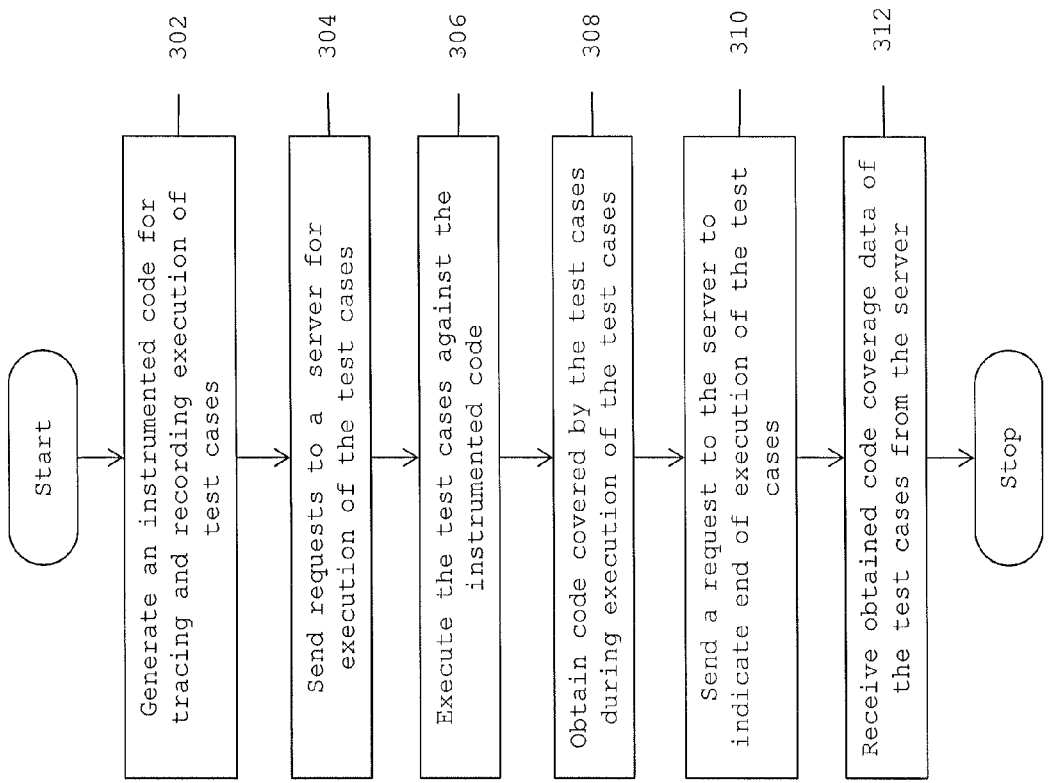
FIG. 3 is a flowchart of a method for obtaining code coverage data of test cases, in accordance with an embodiment of the present invention.

FIG. 3 is a flowchart of a method for obtaining code coverage data of test cases, in accordance with an embodiment of the present invention.

At step 302, an instrumented code is generated for tracing and recording execution of test cases. In an embodiment of the present invention, software application codes under test are modified with a set of instructions to obtain the instrumented code. The instrumented code is deployed on a server where it traces and records execution of test cases. In an exemplary embodiment of the present invention, the test cases are the automated manual test cases. In another exemplary embodiment of the present invention, the test cases are the automated test cases. In yet another exemplary embodiment of the present invention, the test cases are the optimized test cases. In another exemplary embodiment of the present invention, the test cases are the manual test cases.

At step 304, requests are sent to the server for execution of the test cases. In an embodiment of the present invention, a unique identification is assigned to each test case. The assigned unique identifications are sent to the server by as part of header in the requests for execution of test cases. The requests are received in the server and the test cases are identified using the respective unique identifications.

At step 306, the test cases are executed against the instrumented code. In an embodiment of the present invention, the test cases are executed by execution threads which are identified by the server based on their correspondence to each of the test cases.

At step 308, code covered by the test cases is obtained during execution of the test cases. In an embodiment of the present invention, at the time of test case execution, lines of code covered by each of the test cases are captured. Based on the captured lines of code, the code coverage data is obtained. The code coverage data represents percentage of code covered by the test cases. The code coverage data is recorded and stored against corresponding test cases.

At step 310, a request is sent to the server to indicate end of execution of the test cases. At step 312, the obtained code coverage data of the test cases are received from the server.

Figure 4:
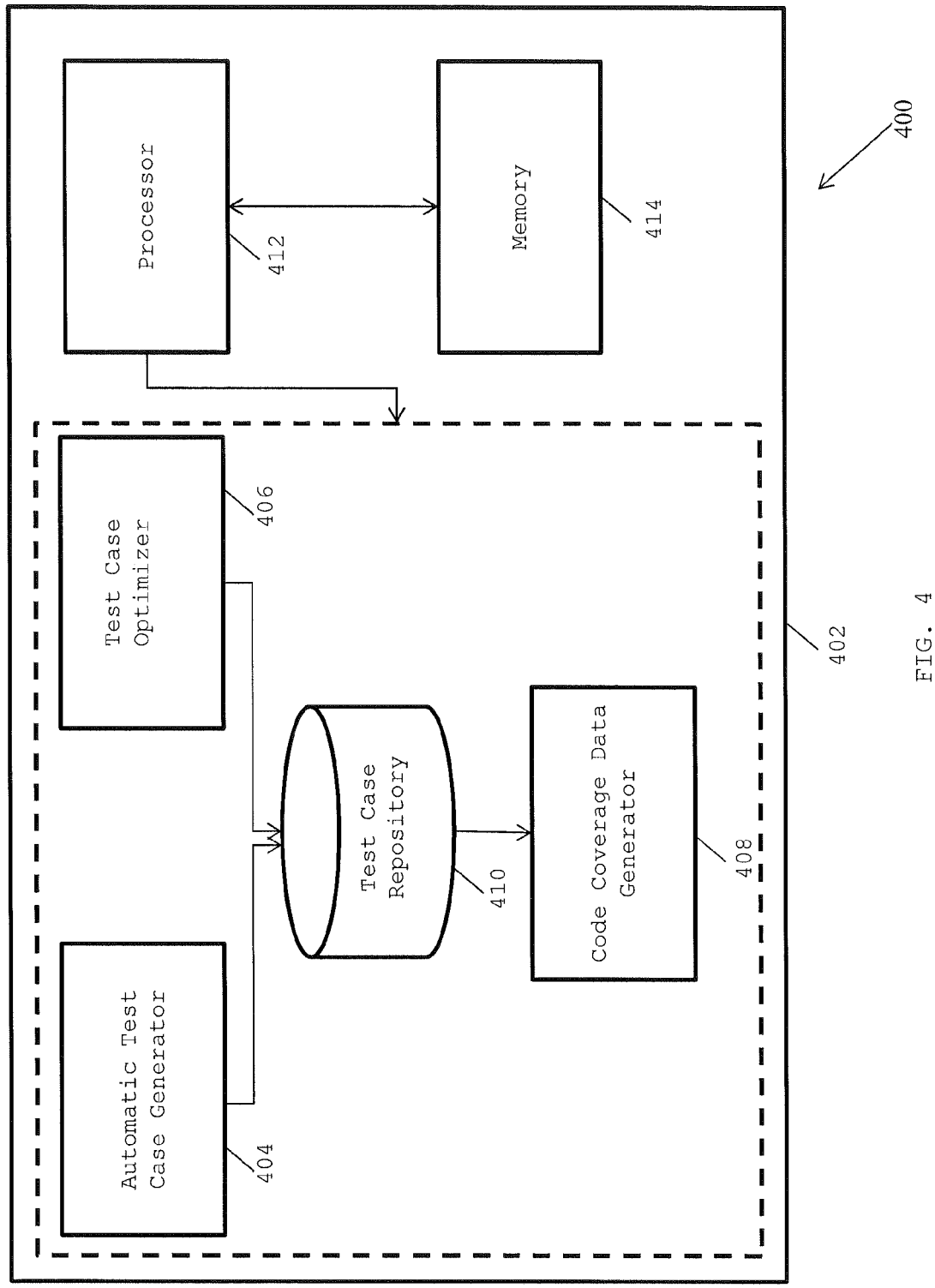
FIG. 4 is a block diagram of a system for automatically generating test cases, in accordance with an embodiment of the present invention.

FIG. 4 is a block diagram of a system for automatically generating black box test cases, in accordance with an embodiment of the present invention. In various embodiments of the present invention, the system 402 comprises an automatic test case generator 404, a test case optimizor 406, a code coverage data generator 408, and a test case repository 410. The automatic test case generator 404, the test case optimizer 406, the code coverage data generator 408, and the test case repository 410 operate in communication with a processor 412 and a memory 414.

The automatic test case generator 404 is configured to generate test cases automatically using automated manual test cases from business models related to one or more software applications under test. In an embodiment of the present invention, the automatic test case generator 404 generates the test cases automatically by parsing the automated manual test cases to identify one or more parameters. The automated manual test cases are generated using the one or more parameters. These parameters are tagged to the nodes of the business models by the tester at the time of creating the business models. The automated manual test cases are stored in the test case repository 410. The business models have been explained in detail in conjunction with FIG. 1. In an exemplary embodiment of the present invention, the one or more parameters include detailed test steps, expected results, user inputs, and actions related to testing of the software applications. In another exemplary embodiment of the present invention, the one or more parameters include user interface elements of the software applications under test and the corresponding action. The identified parameters are stored in one or more repositories (not shown) of the automatic test case generator 404.

The automatic test case generator 404 is further configured to retrieve the identified parameters from the one or more repositories (not shown) and generate the automated test cases. The automated test cases are associated with the nodes of the business models. The automated test case generation has been explained in detail in conjunction with FIG. 1. The automatic test case generator 404 stores the automated test cases in the test case repository 410. The automatic test case generator 404 is in communication with the processor 412 which executes a set of program instructions to generate the automated test cases. The processor 412 is coupled to the memory 414. The memory 414 stores the program instructions which are used to execute the functionalities of the automatic test case generator 404.

In an embodiment of the present invention, the automatic test case generator 404 provides one or more views to trace requirements associated with the software applications under test. The one or more views are graphical representations which facilitate end-to-end traceability of the automated manual test cases, business models, automated test cases which are generated automatically using the manual test cases, and object repository which stores objects associated with the automated test cases. In an exemplary embodiment of the present invention, the one or more views comprise a manual test case view, a code view, a model view and an object repository view.

In an exemplary embodiment of the present invention, the model view facilitates traceability from a particular node in the business models to corresponding test steps in the automated manual test case, to corresponding automated test case and respective objects in the object repository that are associated with the automated test case. In another exemplary embodiment of the present invention, the code view facilitates mapping of test steps in the automated test case to test steps in the automated manual test case, nodes in the business models and to corresponding objects in the object repository. In another exemplary embodiment of the present invention, the automated manual test case view facilitates mapping of test steps in the automated manual test case to test steps in generated automated test case, to a particular node in the business models and to objects in the object repository. In yet another exemplary embodiment of the present invention, the object repository view facilitates the tester to select any object and trace the corresponding automated manual test cases or automated test cases.

In another embodiment of the present invention, the one or more views of the automatic test case generator 404 facilitate forward traceability and backward traceability. Forward traceability enables tracing requirements related to the software applications from automated manual test cases to object repository through code and business models. Backward traceability enables tracing requirements related to the software applications from objects in the repository to the test steps in the automated manual test cases through code and business models.

The test case optimizer 406 is configured to retrieve the test cases from the test case repository 410 and optimize the retrieved test cases. In an exemplary embodiment of the present invention, the retrieved test cases are automated test cases. In another exemplary embodiment of the present invention, the retrieved test cases are automated manual test cases. The test case optimizer 406 optimizes the test cases by determining minimal path coverage of the retrieved test cases in the business models. The minimal path coverage comprises the test cases that cover each node in the business models at least once. The test case optimizer 406 determines the minimal path coverage of the test cases by analyzing the paths covered by the test cases in the business models using a path analysis algorithm. The path analysis algorithm is described in detail in conjunction with FIG. 2. The test cases that form a part of the minimal path coverage are the optimized test cases. The optimized test cases are stored in the test case repository 410. The test case optimizer 406 is in communication with the processor 412 which executes a set of program instructions to optimize the test cases. The processor 412 is coupled to the memory 414. The memory 414 stores the program instructions which are used to execute the functionalities of the test case optimizer 406.

The code coverage data generator 408 is configured to retrieve the test cases stored in the test case repository 410 to execute the test cases against the software applications under test. The code coverage data generator 408 is further configured to capture lines of code covered by the test cases during execution of the test cases. In an embodiment of the present invention, the code coverage data generator 408 is configured to retrieve the optimized test cases from the test case repository 410. The optimized test cases are executed against the software applications. The code coverage data generator 408 is configured to capture lines of code covered by the optimized test cases during execution of the test cases. The code coverage data represents percentage of code covered by the test cases. Based on the code coverage data, the testers can perform effective black box testing of the software applications by efficient prioritization and optimization of the test cases. In another embodiment of the present invention, the code coverage data generator 408 is configured to retrieve automated test cases from the test case repository 410 and obtain code coverage data of the automated test cases. In yet another embodiment of the present invention, the code coverage data generator 408 is configured to retrieve automated manual test cases from the test case repository 408 and obtain code coverage data of the automated manual test cases. In another exemplary embodiment of the present invention, the code coverage data generator 408 is configured to obtain code coverage data of the manual test cases.

The code coverage data generator 408 is in communication with the processor 412 which executes a set of program instructions to obtain code coverage data of the test cases. The processor 412 is coupled to the memory 414. The memory 414 stores the program instructions which are used to execute the functionalities of the code coverage data generator 408.

Figure 5:
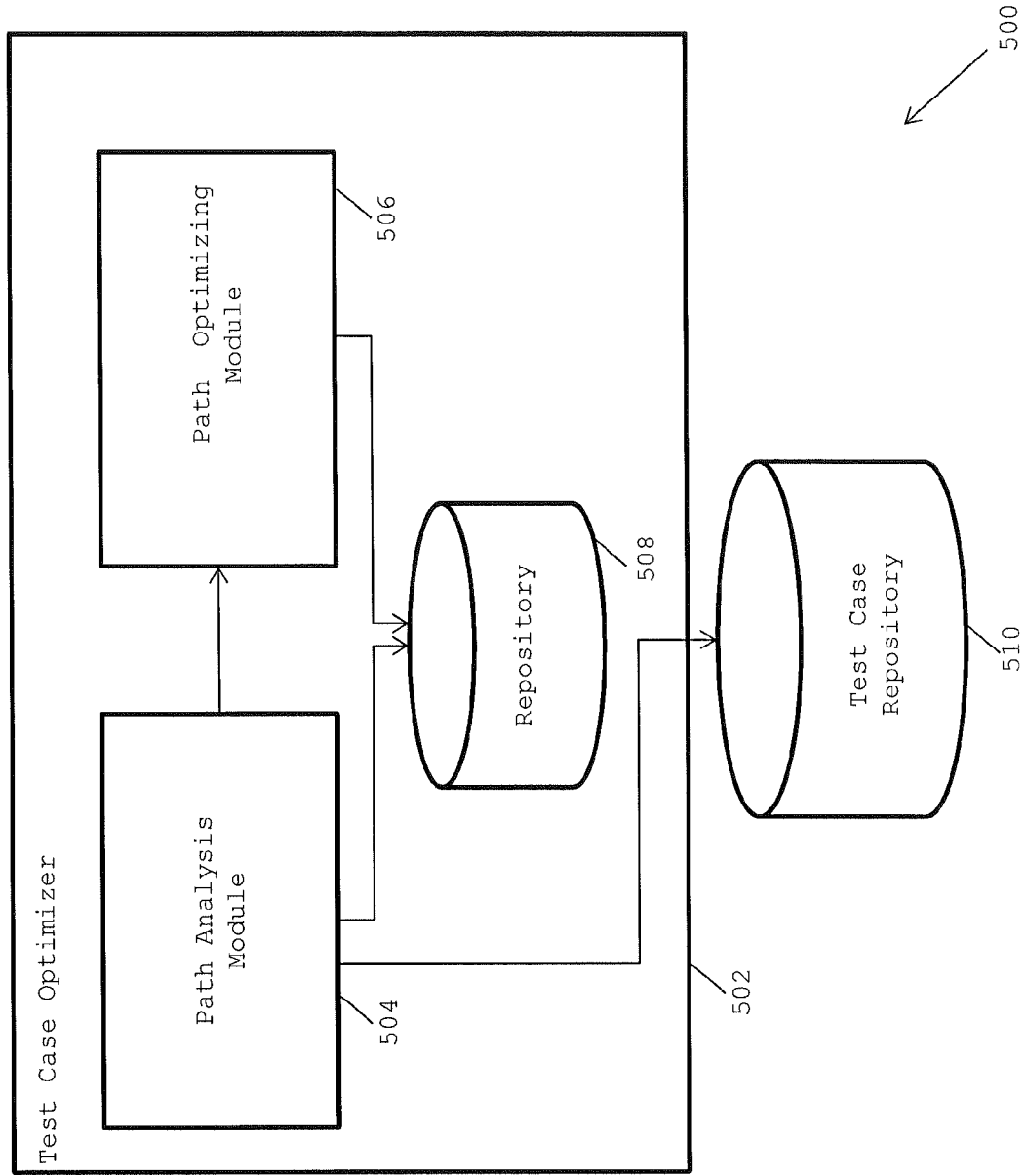
FIG. 5 is a block diagram of a test case optimizer, in accordance with an embodiment of the present invention.

FIG. 5 is a block diagram of a test case optimizer, in accordance with an embodiment of the present invention. The test case optimizer 502 comprises a path analysis module 504, a path optimizing module 506 and a repository 508. In an embodiment of the present invention, the path analysis module 504 is configured to retrieve the automatically generated test cases stored in the test case repository 510 (as described in conjunction with FIG. 4). The path analysis module 504 is further configured to analyze the paths covered by the retrieved test cases in the business models using a path analysis algorithm. In an exemplary embodiment of the present invention, the path analysis module 504 retrieves the automated manual test cases. In another exemplary embodiment of the present invention, the path analysis module 504 retrieves the automated test cases.

Based on the analysis, unique paths covered by the test cases in the business models are obtained. The unique paths are paths that cover one or more nodes in the business models only once and therefore do not have redundant path coverage. The unique paths are obtained by inputting various paths, identifying cyclic and acyclic paths and outputting a list of unique paths. The path analysis algorithm is described in detail in conjunction with FIG. 2. The obtained unique paths are stored in the repository 508 in a list named "paths". The path analysis module 504 is in communication with the processor (not shown) which executes a set of program instructions to perform the path analysis. The processor (not shown) is coupled to the memory (not shown). The memory (not shown) stores the program instructions which are used to execute the functionalities of the path analysis module 504.

The path optimizing module 506 is configured to optimize the unique paths that are obtained by the path analysis module 504. For optimizing the unique paths, the path optimizing module 506 is configured to create a matrix of all the nodes in the business models. In an exemplary embodiment of the present invention, the matrix is created in the form of a key value pair with a node as the key and a Boolean flag indicating the node as covered or uncovered as the value. Initially, all the nodes in the matrix are marked as uncovered. The path optimizing module 506 is further configured to identify a path in the matrix which contains the maximum number of uncovered nodes by iterating over all the paths in the matrix. Further, all the nodes in the identified path are marked as covered in the matrix. The path optimizing module 506 then stores the identified path with maximum number of uncovered nodes in the repository 508 in a first list named "optimized paths".

Further, the path optimizing module 506 is configured to access the unique paths stored in the list named "paths" in the repository 508 and remove the identified path with maximum number of uncovered nodes from the list named "paths". The path optimizing module 506 then stores these paths in a second list named "optimized paths" in the repository 508. Furthermore, the path optimizing module 506 iterates over all the paths in the matrix to find paths with maximum number of uncovered nodes until all the nodes in the matrix are covered.

In particular, as the path optimizing module 506 identifies paths with maximum number of uncovered nodes, the nodes in the identified paths are covered in the matrix. Consequently, the path optimizing module 506 repeats the process of iterating over all the paths to identify paths with maximum number of uncovered nodes until all the nodes in the matrix are covered.

At the end of the iteration process, all the nodes in the matrix are covered and the path optimizing module 506 identifies the paths with maximum number of uncovered nodes. These paths are the paths with minimal path coverage. The path optimizing module 506 finally stores the paths with minimal path coverage in the repository 508 in the second list named "optimized paths". In an embodiment of the present invention, the second list "optimized paths" finally contains paths which covers each node in the business model at least once when all the nodes are covered in the matrix. These paths with minimal path coverage of the test cases are the optimized paths. The test cases that form a part of the minimal path coverage are the optimized set of test cases. The optimized test cases provide optimized test case scenarios. The path optimizing module 506 is in communication with the processor (not shown) which executes a set of program instructions to perform the path optimization. The processor (not shown) is coupled to the memory (not shown). The memory (not shown) stores the program instructions which are used to execute the functionalities of the path optimization module 506.

Figure 6:
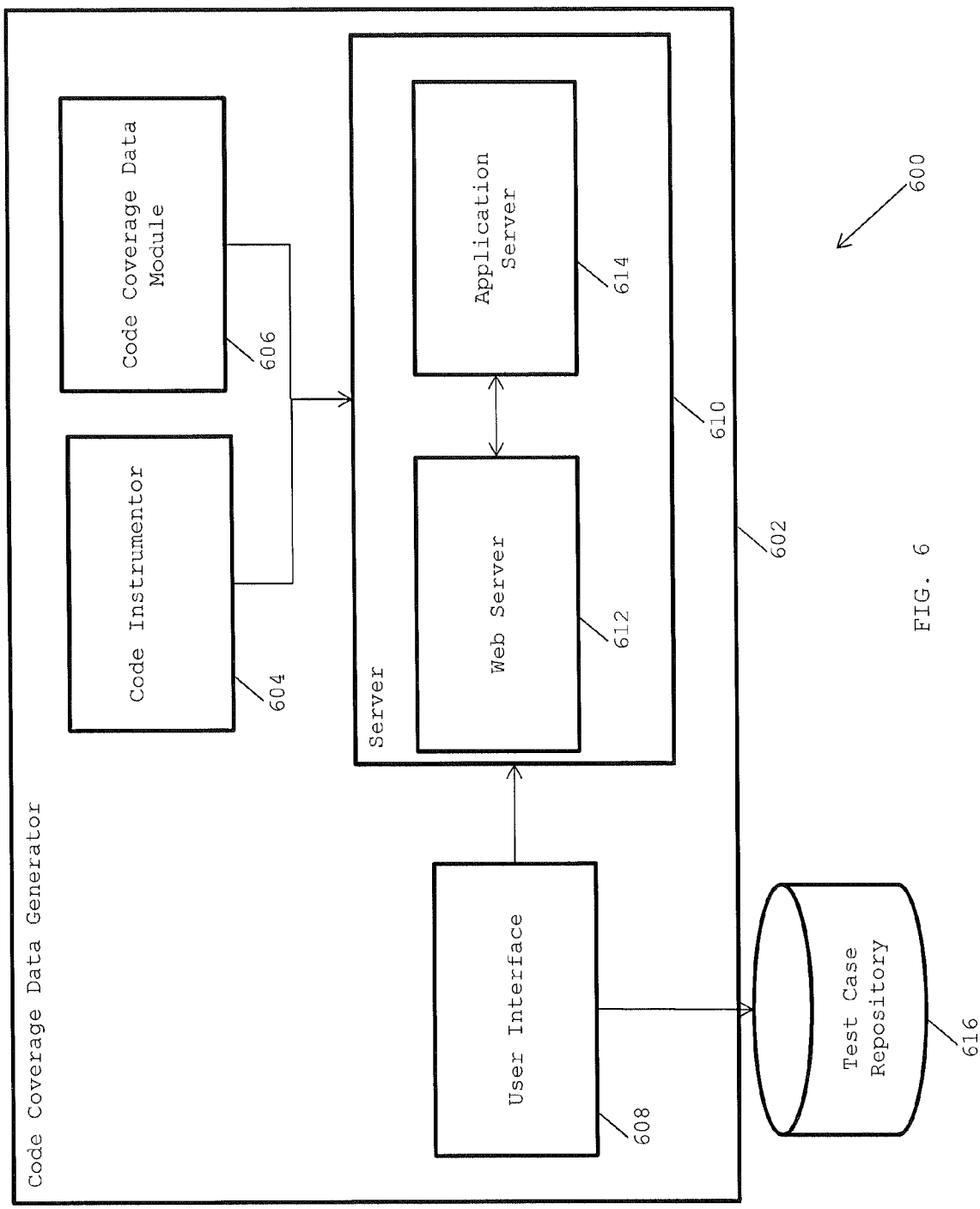
FIG. 6 is a block diagram of a code coverage generator, in accordance with an embodiment of the present invention.

FIG. 6 is a block diagram of a code coverage generator, in accordance with an embodiment of the present invention. In an embodiment of the present invention, the code coverage data generator 602 comprises a code instrumentor 604, a code coverage data module 606, a user interface 608 and a server 610. The server 610 comprises a web server 612 and an application server 614.

The code instrumentor 604 is configured to instrument i.e. modify the software applications under test with a set of instructions to obtain an instrumented code. The instrumented code is deployed on the server 610. The instrumented code is generated for facilitating tracing and recording execution of test cases. These test cases are retrieved from the test case repository 616 (as described in conjunction with FIG. 4). In an exemplary embodiment of the present invention, the retrieved test cases are the optimized test cases (as described in conjunction with FIG. 5). In another exemplary embodiment of the present invention, the retrieved test cases are the automated test cases (as described in conjunction with FIG. 4). In yet another exemplary embodiment of the present invention, the test cases are the automated manual test cases (as described in conjunction with FIG. 4). In another exemplary embodiment of the present invention, the test cases are the manual test cases. A unique identification is assigned to each of the retrieved test cases. Requests for execution of the test cases are sent by the tester to the server 610 via the user interface 608. The requests include the unique identification assigned to each test case as part of header in the requests.

In an embodiment of the present invention, the user interface 608 may include a web based interface on a web browser or an application interface. The tester sends requests for execution of the test cases to the web server 612 via the web browser. The web server 612 intercepts the requests received via the web browser and identifies the test cases using the respective unique identifications. The application server 614 stores the instrumented code. Execution threads are identified in the application server 614 that correspond to each of the identified test cases. The test cases are executed by the identified execution threads against the stored instrumented code.

At the time of test case execution, lines of code covered by each of the test cases are captured.

The code coverage data module 606 receives the captured lines of code from the server 610 and obtains code coverage data. The code coverage data represents percentage of code covered by the test cases. The code coverage data is recorded and stored against corresponding test cases. Based on the code coverage data, the test cases are prioritized and optimized for effective black box testing. The prioritization and optimization is described in conjunction with FIG. 1.

In an embodiment of the present invention, the code coverage data module 606 may comprise a code coverage monitor (not shown) and a code coverage data collector (not shown). The code coverage monitor (not shown) is configured to monitor the execution of test cases and to ascertain code coverage percentage. The code coverage data collector (not shown) is configured to collect coverage details related to multiple testers if multiple testers are involved in testing the software applications. The collected details are consolidated for further processing and analysis.

The various embodiments of the present invention are implemented as a tool which is developed using a programming language such as JAVA. The tool is configured for automatically generating test cases, optimizing the automatically generated test cases and capturing code coverage data of the test cases for black box testing. The tool can be implemented via one or more computer systems.

Figure 7:
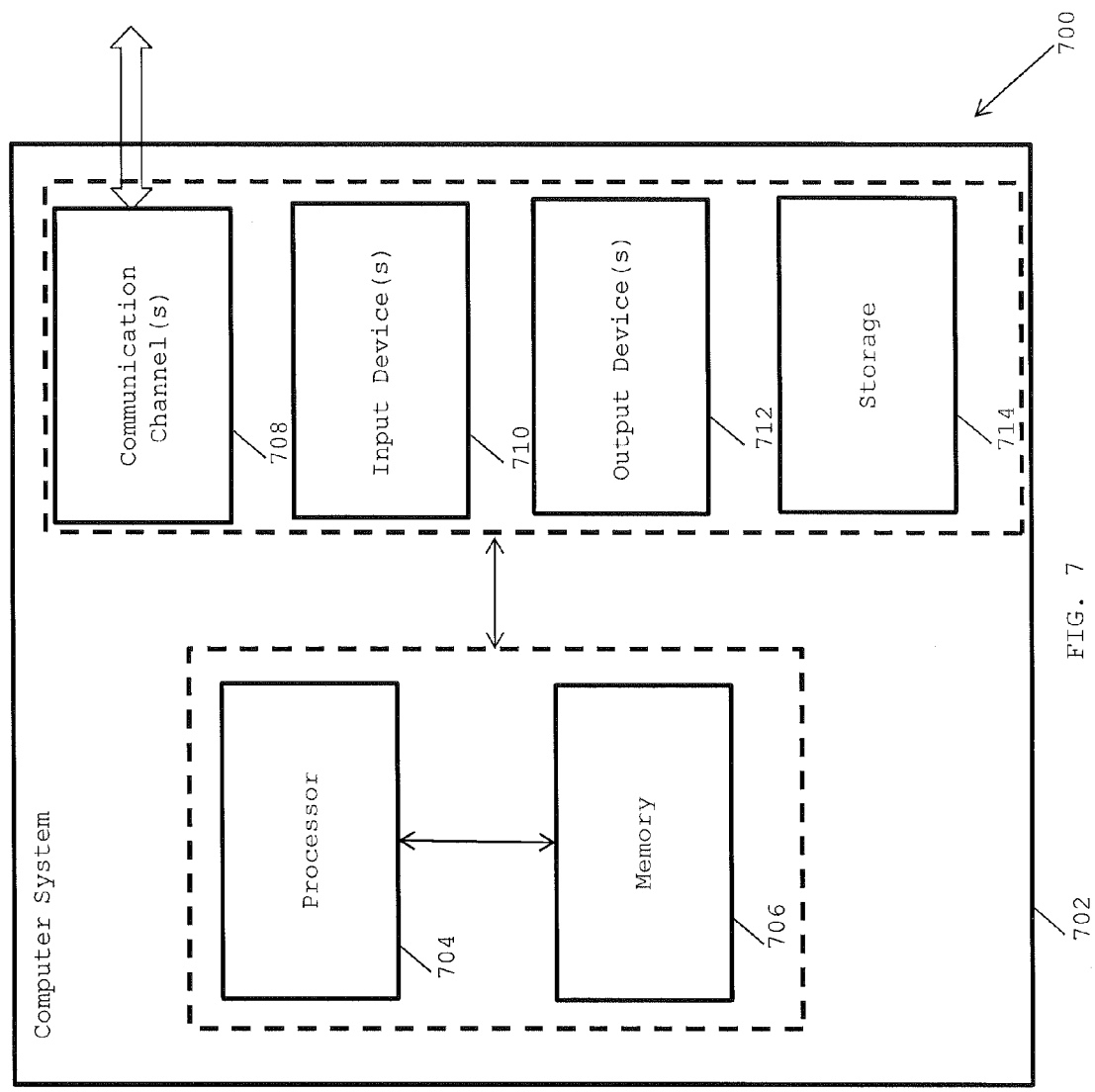
FIG. 7 illustrates an exemplary computer system in which various embodiments of the present invention may be implemented.

FIG. 7 illustrates an exemplary computer system in which various embodiments of the present invention may be implemented.

The computer system 702 comprises a processor 704 and a memory 706. The processor 704 executes program instructions and may be a real processor. The processor 704 may also be a virtual processor. The computer system 702 is not intended to suggest any limitation as to scope of use or functionality of described embodiments. For example, the computer system 702 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 706 may store software for implementing various embodiments of the present invention. The computer system 702 may have additional components. For example, the computer system 702 includes one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702, and manages different functionalities of the components of the computer system 702.

The communication channel(s) 708 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 710 may include, but not limited to, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not limited to, a user interface on CRT or LCD, printer, speaker, CD/DVD writer, or any other device that provides output from the computer system 702.

The storage 714 may include, but not limited to, magnetic disks, magnetic tapes, CD-ROMs, CD-RWs, DVDs, flash drives or any other medium which can be used to store information and can be accessed by the computer system 702. In various embodiments of the present invention, the storage 714 contains program instructions for implementing the described embodiments.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 702. The method described herein is typically implemented as a computer program product, comprising a set of program instructions which is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer-implemented method for generating and processing one or more test cases, via program instructions stored in a memory and executed by a processor, for effective black box testing of software applications, the computer-implemented method comprising:

automatically generating one or more test cases, by the processor, based on one or more parameters, wherein the one or more parameters are identified from one or more automated manual test cases associated with one or more business models, and further wherein the generated one or more automated test cases cover one or more paths in the one or more business models;

optimizing, by the processor, the one or more automated test cases, wherein the one or more automated test cases are optimized by determining minimal path covered by the one or more automated test cases in the one or more business models based on analysis of the one or more paths covered by the one or more automated test cases in the one or more business models; and obtaining, by the processor, code coverage data of the optimized test cases, the code coverage data being obtained by execution of the optimized test cases, wherein the code coverage data represents percentage of code of the software applications covered by the optimized test cases; and analyzing, by the processor, the optimized test cases for at least prioritization and further optimization of the optimized test cases based on the code coverage data and one or more predetermined conditions for black box testing, wherein optimizing the one or more automated test cases by determining minimal path covered by the one or more automated test cases in the one or more business models comprises:

a. obtaining one or more unique paths covered by the one or more automated test cases in the one or more business models, wherein the one or more unique paths represent paths that cover one or more nodes in the one or more business models only once;

b. storing the obtained unique paths in a first list in a repository;

c. creating a matrix of a plurality of nodes of the one or more business models, wherein the matrix comprises one or more paths covered by the one or more automated test cases, and further wherein the one or more paths covered by the one or more automated test cases include the unique paths;

d. identifying a path in the matrix with maximum number of uncovered nodes, wherein the path is identified by iterating over the one or more paths covered by the one or more automated test cases in the matrix;

e. removing the identified path with maximum number of uncovered nodes from the first list of unique paths and storing the identified path in a second list in the repository;

f. repeating step d until each of the plurality of nodes in the matrix are covered to identify one or more paths with maximum number of uncovered nodes in the matrix; and g. removing the identified one or more paths with maximum number of uncovered nodes from the first list of unique paths and storing the identified one or more paths in the second list in the repository, wherein the one or more paths stored in the second list represent paths that cover each of the plurality of nodes in the one or more business models at least once.

2. The computer-implemented method of claim 1, wherein the one or more parameters comprise at least one of: test steps, expected results, user inputs and actions related to testing of the software applications.

3. The computer-implemented method of claim 1, wherein the one or more parameters comprise one or more user interface elements of the software applications and corresponding actions.

4. The computer-implemented method of claim 1, wherein the one or more automated manual test cases are generated automatically using the one or more parameters in the one or more business models, the one or more parameters being manually tagged to one or more nodes of the one or more business models.

5. The computer-implemented method of claim 1, wherein the one or more parameters are identified from the one or more automated manual test cases by parsing the one or more automated manual test cases.

6. The computer-implemented method of claim 1, wherein analyzing the one or more paths covered by the one or more automated test cases in the one or more business models comprises processing cyclic paths and acyclic paths in the one or more business models using a path analysis algorithm to obtain the one or more unique paths.

7. The computer-implemented method of claim 1, wherein identifying paths in the matrix with maximum number of uncovered nodes comprises marking all the nodes in the identified paths as covered in the matrix.

8. The computer-implemented method of claim 1, wherein obtaining code coverage data of the optimized test cases comprises:
   executing the optimized test cases against an instrumented code, wherein the instrumented code is obtained by modifying the software applications by inserting a set of instructions for tracing and recording the optimized test cases during execution of the optimized test cases; and
   capturing lines of code of the software applications during execution of the optimized test cases to obtain the code coverage data.

9. The computer-implemented method of claim 8, wherein analyzing the optimized test cases based on the code coverage data and the one or more predetermined conditions for black box testing comprises at least one of: assigning a high priority to the optimized test cases that captures maximum lines of code and assigning a low priority to the optimized test cases that captures minimum lines of code.

10. The computer-implemented method of claim 8, wherein analyzing the optimized test cases based on the code coverage data and the one or more predetermined conditions for black box testing comprises assigning a high priority to the optimized test cases that cover critical code paths in the software application code.

11. The computer-implemented method of claim 8, wherein analyzing the optimized test cases based on the code coverage data and the one or more predetermined conditions for black box testing comprises further optimizing the optimized test cases by identifying the test cases that cover the same lines of code.

12. The computer-implemented method of claim 8, wherein analyzing the optimized test cases based on the code coverage data and the one or more predetermined conditions for black box testing comprises:
   verifying a modified software application code against corresponding software application code; and
   identifying the optimized test cases corresponding to the modified software application using the code coverage data based on the verification for performing impact analysis of the identified optimized test cases.

13. A system for generating and processing one or more test cases for effective black box testing of software applications, the system comprising:
   at least one or more processors;
   an automatic test case generator in communication with the at least one or more processors and configured to automatically generate one or more test cases based on one or more parameters, wherein the one or more parameters are identified from one or more automated manual test cases associated with one or more business models, and further wherein the generated one or more automated test cases cover one or more paths in the one or more business models;
   a test case optimizer in communication with the at least one or more processors and configured to optimize the one or more automated test cases, wherein the one or more automated test cases are optimized by determining minimal path covered by the one or more automated test cases in the one or more business models based on analysis of the one or more paths covered by the one or more automated test cases in the one or more business models; and
   a code coverage data generator in communication with the at least one or more processors and configured to obtain code coverage data of the optimized test cases, the code coverage data being obtained by execution of the optimized test cases, wherein the code coverage data represents percentage of code of the software applications covered by the optimized test cases, and further wherein the optimized test cases are processed based on the code coverage data for black box testing;
   wherein optimizing the one or more automated test cases by determining minimal path covered by the one or more automated test cases in the one or more business models comprises:
      a. obtaining one or more unique paths covered by the one or more automated test cases in the one or more business models, wherein the one or more unique paths represent paths that cover one or more nodes in the one or more business models only once;
      b. storing the obtained unique paths in a first list in a repository;
      c. creating a matrix of a plurality of nodes of the one or more business models, wherein the matrix comprises one or more paths covered by the one or more automated test cases, and further wherein the one or more paths covered by the one or more automated test cases include the unique paths;
      d. identifying a path in the matrix with maximum number of uncovered nodes, wherein the path is identified by iterating over the one or more paths covered by the one or more automated test cases in the matrix;
      e. removing the identified path with maximum number of uncovered nodes from the first list of unique paths and storing the identified path in a second list in the repository;
      f. repeating step d until each of the plurality of nodes in the matrix are covered to identify one or more paths with maximum number of uncovered nodes in the matrix; and
      g. removing the identified one or more paths with maximum number of uncovered nodes from the first list of unique paths and storing the identified one or more paths in the second list in the repository, wherein the one or more paths stored in the second list represent paths that cover each of the plurality of nodes in the one or more business models at least once.

14. The system of claim 13 further comprising: a test case repository for storing at least one of: the automated manual test cases, the automated test cases and the optimized test cases.

15. The system of claim 13, wherein the test case optimizer further comprises:
   a path analysis module in communication with the processor and configured to analyze the one or more paths covered by the one or more automated test cases in the one or more business models to obtain the one or more unique paths that cover one or more nodes in the one or more business models only once;
   a path optimizing module in communication with the processor and configured to determine the one or more paths with maximum number of uncovered nodes from the one or more unique paths; and
   a repository for storing the identified one or more paths that represent paths that cover the plurality of nodes in the one or more business models at least once.

16. A computer program product comprising:

a non-transitory computer-readable medium having computer-readable program code stored thereon, the computer-readable program code comprising instructions that, when executed by a processor, cause the processor to:

automatically generate one or more test cases based on one or more parameters, wherein the one or more parameters are identified from one or more automated manual test cases associated with one or more business models, and further wherein the generated one or more automated test cases cover one or more paths in the one or more business models;

optimize the one or more automated test cases, wherein the one or more automated test cases are optimized by determining minimal path covered by the one or more automated test cases in the one or more business models based on analysis of the one or more paths covered by the one or more automated test cases in the one or more business models;

obtain code coverage data of the optimized test cases, the code coverage data being obtained by execution of the optimized test cases, wherein the code coverage data represents percentage of code of software applications covered by the optimized test cases; and analyze the optimized test cases for at least prioritization and further optimization of the optimized test cases based on the code coverage data and one or more predetermined conditions for black box testing;

wherein optimizing the one or more automated test cases by determining minimal path covered by the one or more automated test cases in the one or more business models comprises:

a. obtaining one or more unique paths covered by the one or more automated test cases in the one or more business models, wherein the one or more unique paths represent paths that cover one or more nodes in the one or more business models only once;

b. storing the obtained unique paths in a first list in a repository;

c. creating a matrix of a plurality of nodes of the one or more business models, wherein the matrix comprises one or more paths covered by the one or more automated test cases, and further wherein the one or more paths covered by the one or more automated test cases include the unique paths;

d. identifying a path in the matrix with maximum number of uncovered nodes, wherein the path is identified by iterating over the one or more paths covered by the one or more automated test cases in the matrix;

e. removing the identified path with maximum number of uncovered nodes from the first list of unique paths and storing the identified path in a second list in the repository;

f. repeating step d until each of the plurality of nodes in the matrix are covered to identify one or more paths with maximum number of uncovered nodes in the matrix; and g. removing the identified one or more paths with maximum number of uncovered nodes from the first list of unique paths and storing the identified one or more paths in the second list in the repository, wherein the one or more paths stored in the second list represent paths that cover each of the plurality of nodes in the one or more business models at least once.

\* \* \* \* \*